United States Patent [19]

Waller

[11] 4,077,121

[45] Mar. 7, 1978

[54] NUT CRACKER

[75] Inventor: Campbell Ernst Waller, Eltham, Australia

[73] Assignee: Wiltshire Cutlery Company Proprietary Ltd., Victoria, Australia

[21] Appl. No.: 682,782

[22] Filed: May 3, 1976

[30] Foreign Application Priority Data

May 5, 1975 Australia .............................. 1482/75

[51] Int. Cl.² .......................... A47J 43/26; B26B 17/00
[52] U.S. Cl. .................................................... 30/120.3
[58] Field of Search ........................................ 30/120.3

[56] References Cited

U.S. PATENT DOCUMENTS

| | | | |
|---|---|---|---|
| 641,581 | 1/1900 | Currence | 30/120.3 |
| 851,210 | 4/1907 | Wheaton | 30/120.3 |
| 2,094,243 | 9/1937 | Pickop | 30/120.3 |
| 2,378,084 | 6/1945 | Jackson | 30/120.3 |
| 2,596,382 | 5/1952 | Duke | 30/120.3 |
| 2,990,863 | 7/1961 | Pantermoller | 7/5.6 X |
| 3,048,208 | 8/1962 | Umanoff | 30/120.3 |

FOREIGN PATENT DOCUMENTS 439,263  12/1935  United Kingdom ................ 30/120.3

Primary Examiner—Donald G. Kelly
Assistant Examiner—J. T. Zatarga
Attorney, Agent, or Firm—Diller, Brown, Ramik & Wight

[57] ABSTRACT

A nut cracker having a pair of pivotally connected jaws and a pair of handles, each of which is connected to a respective one of said jaws so that opening and closing movement of the handles causes corresponding movement of the jaws. Each jaw has a working face which is disposed in opposed facing relationship to the corresponding face of the other jaw, and the two working faces diverge generally in the direction of the jaw pivot axis so as to define a wedge-shaped crushing space between them. Stop means is provided to limit the opening and closing movement of the jaws, and resilient means acts between the handles to bias them outwardly and thereby normally maintain the jaws in an opened position.

8 Claims, 10 Drawing Figures

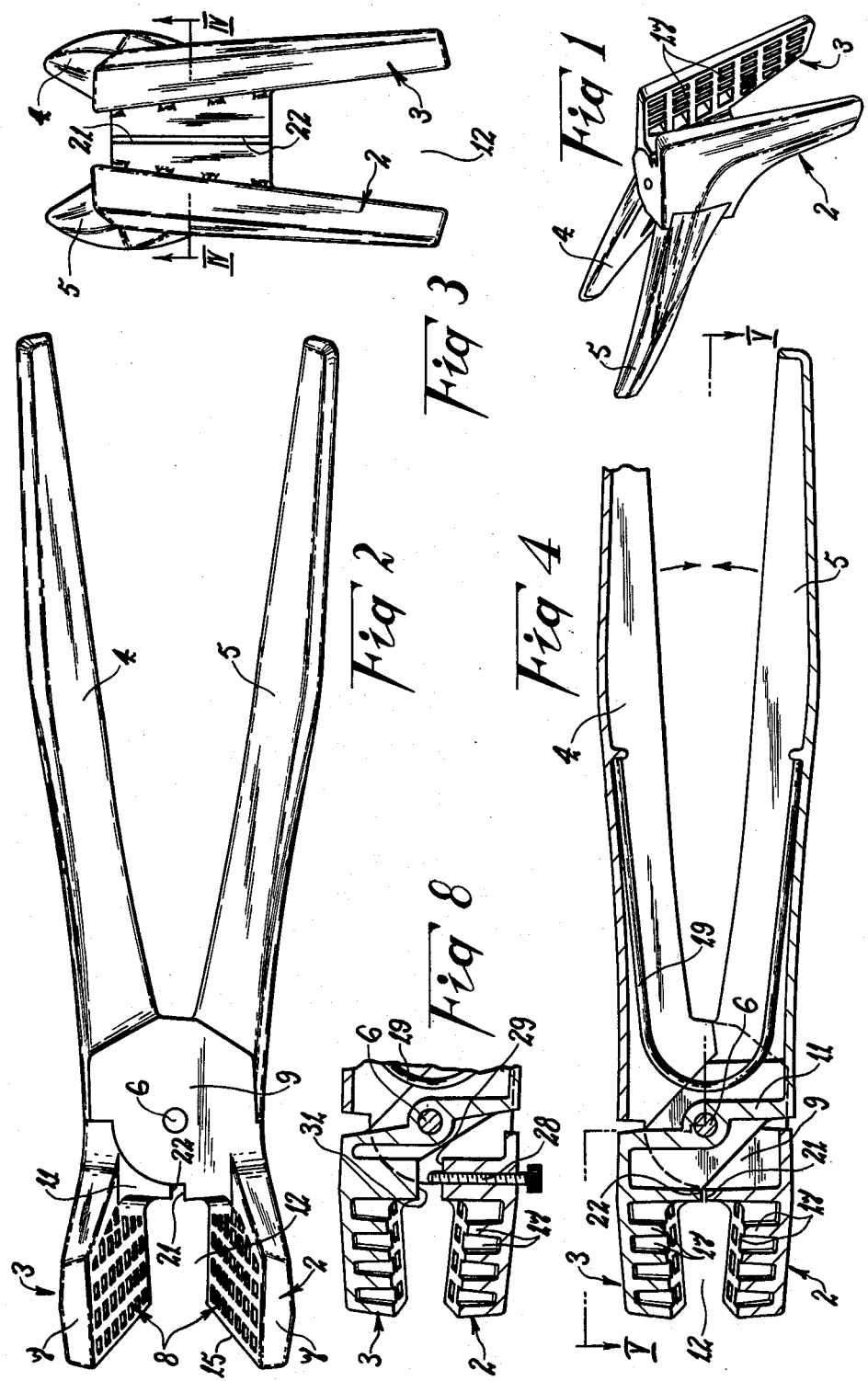

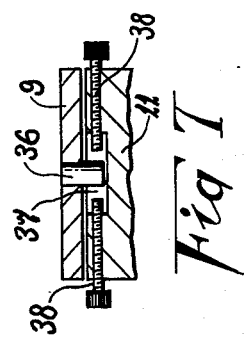
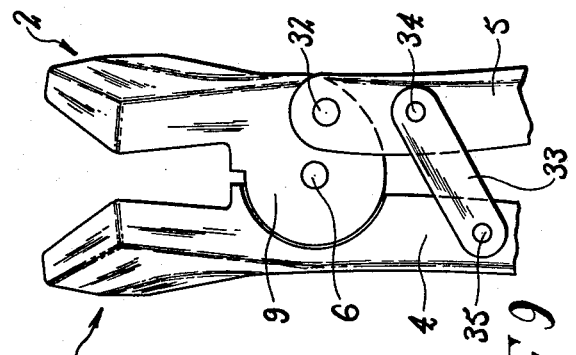
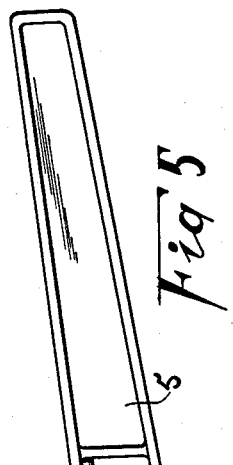
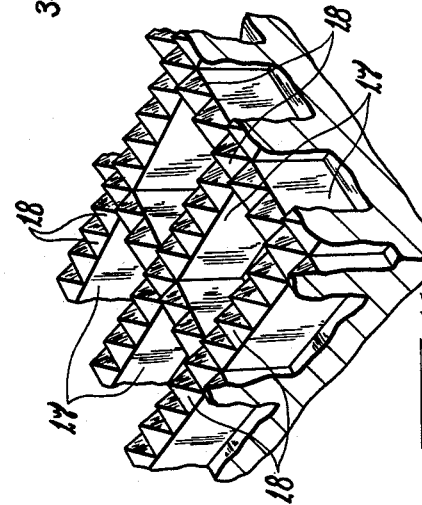
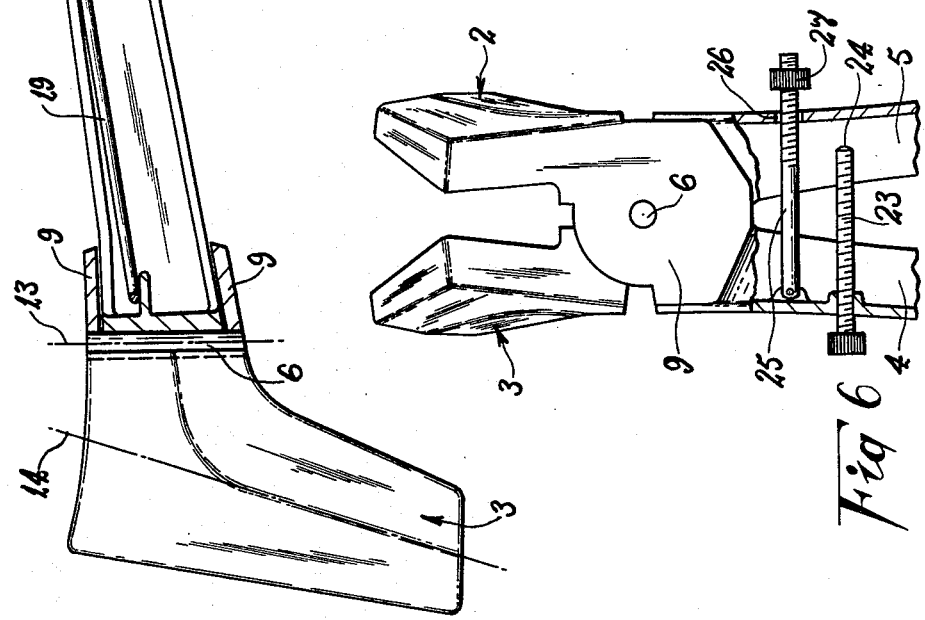

NUT CRACKER

This invention relates to devices of the kind used to fracture or crack nuts, and is particularly concerned with such devices of the hand held kind having a pair of crushing jaws between which the nut is located, and handles attached to the jaws and operable to control movement of those jaws.

In hand held devices of the aforementioned kind, the handle-jaw arrangement constitutes a linkage system which functions to magnify the force applied at the handles to achieve a suitable crushing force at the jaws. As a result, elastic energy is built up in the device and the hand of the user during a crushing operation, and there is usually no way of controlling that energy so that it is not unusual for the jaws to move through a substantial distance towards one another after the nut shell has fractured. Jaw movement beyond the actual "fractured position" has the disadvantage of damaging the nut, and causing mixture of crushed shell with the fruit of the nut.

Another disadvantage of prior devices is that they are generally expected to function with nuts of a wide variety of sizes, with the result that the operating position of the handles may be uncomfortable, or the handles may not be relatively positioned to facilitate application of the necessary crushing force.

It is a principal object of the present invention to provide a nut cracker device having means for preventing closing movement of the jaws beyond a predetermined position. It is a further object of the invention to provide such a device which is comfortable and with the same force magnification when accommodating nuts of various sizes.

According to the present invention, there is provided a nut cracker including;

a pair of handles;

means connecting the two handles so that they are movable towards and away from each other;

a pair of jaws, each having a working face which is disposed in opposed facing relationship with the corresponding face of the other jaw;

said working faces extending angularly relative to each other to define a wedge-shaped crushing space between them;

each said jaw being connected to a respective one of said handles so as to move in response to said movement of the handles, whereby the size of said crushing space is reduced as said handles move towards each other and is enlarged as said handles move apart; and stop means operative to limit the minimum size of said crushing space.

It is preferred that the connection between the handles is a pivotal connection, and that the working faces of the jaws diverge generally in the direction of the axis of that pivotal connection. It is further preferred that resilient means is provided to act between the handles so as to bias them outwardly and thereby maintain the jaws in an open position. Also, the stop means may be adjustable so as to permit variation of the minimum size of the crushing space.

The following description refers in more detail to these essential features and further optional features of the invention. To facilitate an understanding of the invention, reference is made to the accompanying drawings were these features are illustrated in preferred form. It is to be understood however, that the essential and optional features of the invention are not limited to the specific forms of these features as shown in the drawings.

In the drawings:

FIG. 1 is a perspective view of one embodiment of the invention, shown on a reduced scale.

FIG. 2 is an enlarged plan view of the device shown in FIG. 1 when viewed from underneath and with the jaws fully opened.

FIG. 3 is a front end of the view of the device shown in FIG. 2, but showing the jaws partially closed.

FIG. 4 is a cross-sectional view taken along line IV—IV of FIG. 3.

FIG. 5 is a cross-sectional view taken along line V—V of FIG. 4.

FIG. 6 is a top plan, and partially sectioned, view of a further embodiment of the invention.

FIG. 7 is a cross-sectional view of part only of yet another embodiment of the invention.

FIG. 8 is a plan view of part only of still another embodiment, incorporating a different form of adjustable stop means.

FIG. 9 is a plan view of part only of still another embodiment of the invention, and FIG. 10 is a part of perspective view showing still a further modification of the invention.

The device includes a pair of jaws 2 and 3, and connected handles 4 and 5, and the two jaws 2 and 3 are arranged to swing about a common fulcrum or pivot 6 as in prior constructions. In the embodiment shown, each jaw includes a working section 7 which bears the actual working face 8 of the jaw, and a mounting section (9,11) which is connected to the corresponding section of the other jaw through the pivot pin 6. Instead of connecting the mounting sections 9 and 11 through a pin in aligned holes of the two mounting sections, the pivot connection may comprise a lateral projection formed integral with one mounting section and rotatably located in a bore or recess of the other mounting section. That alternative is not shown in the drawings, and it will be appreciated that other forms of connection are available. The handles 4 and 5 are formed integral with or attached to their respective jaw mounting sections 9 and 11, and as shown in FIGS. 2 and 4, those mounting sections cross at the pivot 6 so that movement of the handles 4 and 5 towards each other causes closing movement of the jaws 2 and 3.

In the embodiment shown, the working section 7 comprises a plate-like element which has a working face 8 in opposed relationship to the corresponding face 8 of the other jaw. The two working faces 8 are arranged to diverge sidewardly of the device — i.e., in the general direction of axis of pivot 6 — so that a wedge shaped crushing space 12 is defined between them.

In the actual embodiment shown, there is a slight difference in the directions of the pivot axis (shown by line 13 in FIG. 5) and the direction in which the jaw faces 8 diverge (see line 14 in FIG. 5). Because of that divergence of directions, there is a difference in the distance travelled by the front and rear edges 15 and 16 respectively of each jaw surface 8 during movement from the fully opened position to the fully closed positon. That difference in travel adds to the versatility of the device, but is not essential as satisfactory performance will be achieved with the lines 13 and 14 parallel, or even diverging in a direction opposite to that shown in FIG. 5.

One or both of the working faces 8 may be substantially flat or contoured as desired, although both are shown flat in the attached drawings. By way of example, at least one face 8 may be concave or otherwise formed to have a shallow depression therein, when viewed from the side of the device. Furthermore, at least one face 8, but preferably both, may have a non-slip or roughened surface, and that may be achieved in many different ways. In the embodiment shown in FIGS. 1 to 3, each of the working faces 8 is roughened to some extent by a network of intersecting ribs 17, which combine to form a series of pockets or cavities in the face 8. FIG. 10 shows how that arrangement may be modified by producing a series of pyramid-like teeth 18 along the outermost face of each rib 17, thereby increasing the non-slip characteristics of the surface 8. Quite clearly, the tooth configuration shown in FIG. 10, is not essential as the desired non-slip characteristics can be achieved by various methods of roughening the outer faces of the ribs 17, such as by serrations or teeth of any configuration.

With the construction and arrangement of jaws 2 and 3 as described, the varying depth of the crushing space 12 permits the handles 4 and 5 to be used in a comfortable position for any one of several different size nuts. Furthermore, because of the sideways arrangement of the jaws 2 and 3, substantially the same lever arm exists between the pivot axis 13 and the crushing zone — i.e., the location of the nut within space 12 — regardless of the size of nut located between jaws 2 and 3.

In a less effective, but nevertheless useful variation of the foregoing construction, which is not shown in the drawings, the jaw 2 and 3 may be arranged so that the crushing faces 8 diverge in a direction transverse to the pivot axis 13. The divergence may be towards or away from that axis 13 according to preference. A disadvantage of this arrangement is that it does not enjoy the substantially constant lever arm as described in relation to the previous embodiment, but that may be acceptable under some circumstances.

Biasing means is provided in the embodiment shown, to normally urge the jaws 2 and 3 into an open position, and that can take any one of several forms. As shown in FIGS. 4 and 5, the biasing means comprises a U-shaped spring 19 having each of its arms engaging inside a respective one of the handles 4 and 5, so as to urge those handles apart. Various alternatives are available however — e.g., a helical compression spring may be disposed between the two handles 4 and 5, and each of the two ends of that spring may be located over a projection or a respective one of the handles; or a leaf spring may be secured to the inner surface of one handle and arranged to bear against the adjacent inner surface of the other handle.

Stop means for limiting closing movement of the jaws 2 and 3 can also take any one of several forms. In the embodiment shown in FIGS. 1 to 5, the stop means for restricting closing movement of the jaws 2 and 3 comprises opposed faces 21 and 22 which are respectively attached to the jaws 2 and 3 (see FIGS. 3 and 4). When the jaws 2 and 3 are fully closed — i.e., the space 12 is at its minimum size — the faces 21 and 22 engage, thereby providing further closing movement of the jaws 2 and 3.

The aforementioned stop means may be adjustable so as to enable variation of the minimum size of the crushing space 12, and one such adjustable stop is shown in FIG. 6. In that construction, a screw 23 extends through a complementary threaded hole in the handle 4, or a part attached thereto, and has an inner end 24 engageable with an inner surface of the other handle 5, or a part attached thereto. Thus, the length of projection of the screw between the handles 4 and 5 determines the closed position of the jaws 2 and 3, and that position can be varied by adjustment of the screw 23. It is preferred to have the stop screw 23 located adjacent the jaw pivot 6, but that is not essential.

In the FIG. 6 arrangement, a further stop is provided to restrict opening movement of the handles 4 and 5, but that is merely preferred. Once again the form can vary considerably according to requirements, but in an example shown, a threaded shaft 25 is secured to the handle 4, projects through a hole 26 in the other handle 5, and has a complementary threaded nut 27 located externally of that handle to be engaged thereby when the handles 4 and 5 have opened to a predetermined position. The fully opened position of the handles 4 and 5 can be varied by adjustment of the nut 27 on the shaft 25. It may be of advantage to have the shaft 25 curved about the axis of the jaw pivot 6 to compensate for the curved path of movement of the handles 4 and 5. Alternatively, the shaft 25 may be pivotally or otherwise movably attached to the handle 4.

Another possible arrangement (not shown) of the opening stop, involves a screw passing freely through a hole in one handle and threadably engaging in the other handle, and having an enlarged head disposed externally of the first mentioned handle.

Still further, either or both of the adjustable stops may cooperate with the jaws rather than the handles. The closing stop for example may act between the mounting sections 9 and 11 of the jaws as shown in FIG. 8. That is, a stop screw 28 threadably engaging in the jaw 2 is arranged so that its inner end 29 is adapted to abut a stop surface 31 of the other jaw 3.

According to a modification of the device as shown in FIG. 9, the two jaw mounting sections 9 and 11 overlap at the pivot connection 6, but do not actually cross. The handles 4 and 5 form part of linkage system such that closing movement of the handles causes corresponding movement of the jaws 2 and 3. In the arrangement shown, the handle 4 is integral with or rigidly secured to the jaw 3, and the other handle 5 is pivotally connected to the jaw 2, with the axis of the pivot 32 being substantially parallel to the axis of the jaw pivot 6. A connecting link 33 has each of its opposite ends pivotally connected to a respective one of the handles 4 and 5, and the pivot 34 between the link 33 and handle 5 is closer to the jaw pivot 6 than is the other link pivot 35. The connecting link 33 is situated between the two handles 4 and 5 and therefore provides a movable fulcrum such that movement of the outer ends of the handles 4 and 5 towards each other, causes closing movement of the jaw 2 and 3.

The aforementioned movable fulcrum may be formed in other ways, such as by a link or other member projecting from the inner surface of one handle which engages with and is slidable along the inner surface of the other handle. That projection may be of fixed dimension, or it may be adjustable — e.g., a screw arranged substantially as the first described closing stop.

In the type of construction as shown in FIG. 9, the biasing means (not shown) may consist of a helical tension spring extending between the handle 4 and the jaw mounting section 9. Also, in that type of construction, the opening stop (if provided) may comprise a screw projecting through and threadably engaging with the handle 4, and having its inner end engageable with a flat surface of the jaw mounting section 9, as in the FIG. 8 arrangement, but the screw would need to be on the handle side of the jaw pivot 6.

FIG. 7 shows another form of the stop means which is applicable to either the device of FIG. 1 or FIG. 9, and which comprises a pin 36 and cooperating recess 37 located at the overlapping part of the two mounting sections 9 and 11. That is, the pin 36 projects from the mounting section 9, generally in the direction of the jaw pivot 6, and locates within a hole or recess 37 formed in the other mounting section 11. Clearance exists between the stop pin 36 and the surrounding surface of the hole or recess 37 so that engagement between the pin 36 and that surface occurs at both ends of the desired range of movement of the jaws 2 and 3. Screws 38, or other means, may be provided to permit adjustment of the clearance at one or both sides of the pin 36 so that at least one of the stop positions can be varied.

It will be appreciated from the foregoing description that the present invention provides a relatively simple but effective crusher device. A particular advantage of the construction is that it avoids excessive damage to the fruit of the nut. Also, if the shell of the nut is not completely fractured in the first crushing operation, the jaws can be opened and the shell reinserted so as to be progressively crushed in successive increments of reinsertion and/or reorientation.

Finally, it is to be understood that various alterations, modifications and/or additions may be introduced into the constructions and arrangements of parts previously described without departing from the spirit or ambit of the invention as defined in the appended claims.

Having now described my invention, what I claim as new and desire to secure by Letters Patent is:

1. A nut cracker including;
   a pair of elongate handles, a pivotal connection having a pivot axis pivotally connecting said handles together for movement towards and away from each other, said handles extending generally transverse to the pivot axis of said pivotal connection;
   a pair of plate-like jaws, each jaw having a broad surface forming a working face which is disposed in opposed facing relationship to the corresponding working face of the other jaw, and said working faces diverging generally in the direction of said pivot axis and defining a wedge-shaped crushing space between them;
   each jaw being elongated generally in the direction of said pivot axis;
   each working face being substantially flat and being defined by a plurality of intersecting ribs having pockets formed therebetween;
   each jaw being connected to a respective one of said handles so that movement of the handles towards and away from each other causes corresponding movement of said jaws about said pivot axis such that the size of said crushing space is reduced and increased respectively;
   each jaw having a longitudinal axis extending generally transverse to that of the respective handle and diverging relative to said pivot axis in a direction from said handle towards a wider end of said wedge-shaped crushing space;
   first and second stop means respectively operarive to limit the extent to which said handles can be moved towards and away from each other and thereby determine the minimum and maximum size of said crushing space;
   and spring means acting between said handles and urging said handles apart.

2. A nut cracker according to claim 1, wherein each of said handles is formed integral with its respective jaw, and there is a mounting section interconnecting respective ones of said handles and jaws, the two handle and jaw combinations being arranged in crossed relationship with said mounting sections thereof in overlapping relation, and said pivotal connection is between said mounting sections.

3. A nut cracker according to claim 1, wherein one of said handles is rigidly secured to its respective jaw, the other of said handles is connected to its respective jaw through a pivotal connection which is laterally spaced from said first mentioned pivotal connection and has its axis substantially parallel to the axis of that pivotal connection, a link is pivotally connected to each of the two handles so as to be located between said first mentioned pivotal connection and the ends of said handles remote from said jaws, and the pivotal connection of said link with said one handle is closer to said first mentioned pivotal connection than is the pivotal connection of the said link with the other said handles.

4. A nut cracker according to claim 3, wherein said first stop means is formed by two opposed surfaces, each being associated with respective jaw and engage one with the other when said crushing space is at said minimum size.

5. A nut cracker according to claim 1, wherein said first stop means is adjustable to permit variation of the minimum size of said crushing space.

6. A nut cracker according to claim 1, wherein said second stop means is adjustable to permit variation of the maximum size of said crushing space.

7. A nut cracker according to claim 1, wherein said second stop means includes a surface on at least one of said handles which is engageable with an opposed surface on the jaw connected to the other handle when said crushing space is at said maximum size.

8. A nut cracker according to claim 1, wherein each said rib has formed along its outermost face teeth, and each tooth terminating in a sharp peak.

* * * * *